United States Patent [19]

Spiegelberg

[11] 4,317,868
[45] Mar. 2, 1982

[54] BATTERY VENT PLUG WITH FLAME ARRESTOR

[75] Inventor: Bernard N. Spiegelberg, Germantown, Wis.

[73] Assignee: Gould Inc., Rolling Meadows, Ill.

[21] Appl. No.: 188,976

[22] Filed: Sep. 19, 1980

[51] Int. Cl.³ .............................................. H01M 2/12
[52] U.S. Cl. ............................................ 429/82; 429/89
[58] Field of Search .................. 429/89, 88, 87, 82, 429/84, 72

[56] References Cited

U.S. PATENT DOCUMENTS

| | | | |
|---|---|---|---|
| 1,459,121 | 6/1923 | Van deWiel | 429/89 |
| 3,108,911 | 10/1963 | Miller | 429/89 |
| 3,466,199 | 9/1969 | Henton | 429/86 |
| 3,879,227 | 4/1975 | Hennen | 429/88 X |
| 3,915,752 | 10/1975 | Gross | 429/86 |
| 3,992,226 | 11/1976 | Godshalk | 429/89 |
| 4,002,495 | 1/1977 | Hakarine | 429/87 |
| 4,072,799 | 2/1978 | Leeson et al. | 429/82 |

*Primary Examiner*—Anthony Skapars
*Attorney, Agent, or Firm*—Augustus J. Hipp

[57] ABSTRACT

A vent plug for use in batteries, such as lead acid batteries. The vent plug is provided with a flame arresting vent passage portion defined by a plurality of elongated small cross section flow passages. The vent plug is adapted for low cost manufacture as by injection molding of separate parts thereof in accurate dimensional coordination. The flame arrestor passages, in the illustrated embodiment, are formed by projecting portions on one of the plug elements extending into fitted engagement with the other of the elements.

30 Claims, 5 Drawing Figures

BATTERY VENT PLUG WITH FLAME ARRESTOR

BACKGROUND OF THE INVENTION

1. Field of the Invention

This invention relates to battery vent plugs and in particular to such vent plugs having flame arresting means.

2. Description of the Background Art

In one early form of battery vent plug illustrated in U.S. Pat. No. 1,459,121 of F. Van deWiel, the vent plug is defined by a body portion and an insert portion threaded to the body portion. The body and insert cooperatively define a tortuous passage for the flow of gases outwardly from the battery while causing liquid particles carried in suspension by the gases to be returned to the battery.

Another form of battery vent plug is illustrated in U.S. Pat. No. 3,108,911 to James H. Miller. As disclosed therein, the vent plug includes a mushroom insert portion depending from a closure across an upper end of an outer body portion. The body portion is further provided with a cylindrical inner surface formed with a plurality of vertically extending ridges functioning as baffles to intersect upwardly spiraling spray and return it to the battery cell.

Roy E. Henton shows, in U.S. Pat. No. 3,466,199, a battery vent plug having a microporous disc vent across the upper end of the vent outlet.

In a subsequent U.S. Pat. No. 3,879,227, of Roy E. Hennen, the patentee discloses the use of a ceramic porous diffuser in a mounting structure adapted for retention and drainback of the electrolyte liquid.

George E. Gross, in U.S. Pat. No. 3,915,752, shows a battery vent plug having a flame barrier filter provided with a domed configuration, permitting the edge thereof to be compressed so as to make the peripheral portion of the filter substantially nonporous to escaping battery gas so that any flame that results from ignition of the vented gas will tend to be confined in the center of the filter. The filter is made of a material having low heat conductivity.

Duane D. Hakarine discloses in U.S. Pat. No. 4,002,495, which patent is owned by the assignee hereof, an explosion-proof vent barrel for a battery having a porous flame-arresting disc carried in the vent barrel body. The device further includes an electrolyte splash baffle.

Jeffrey S. Leeson et al., in U.S. Pat. No. 4,072,799, show a vent plug system for batteries provided with baffles arranged inside the vent plug assembly such that the fluid entering the primary inlet thereof flows in a horizontal direction and is scrubbed to remove the electrolyte therefrom for return to the cell through a drain opening. The vent plug has a low profile so as to be used also on maintenance-free batteries.

SUMMARY OF THE INVENTION

The present invention is directed to an improved battery vent plug which is extremely simple and economical of construction while yet providing the highly improved flame-arresting function.

The vent plug of the present invention includes a body portion adapted to be fitted in the opening of a battery top wall and an insert adapted to be fitted into the body portion.

The body portion and insert define a cooperating baffle arrangement through which gas from the battery is vented.

A portion of the vent passage of the vent plug is provided with a plurality of partitions so as to define a plurality of small cross section elongated flame-arresting passages.

In the illustrated embodiment, the divider means extends between a portion of the body and a portion of the insert when the insert is installed in assembled relationship to the body. In the illustrated embodiment, the divider means comprise ribbed means on the body projecting radially inwardly into engagement with a cylindrical surface of the insert.

The inner diameter of the projecting ribs may be accurately controlled by suitable molding thereof as by an injection molding process, to an accurately sized core pin corresponding to the outer diameter of the cylindrical wall portion of the insert with which the ribs are fitted in the assembled relationship.

Thus, the invention comprehends the forming of the vent plug as a two-piece assembly wherein each of the elements may be accurately formed at low cost by an injection molding process.

The body portion of the vent plug is provided with inlet openings leading to the vent passage. The inlet openings are configured suitably to effect draining of collected electrolyte liquid back to the battery.

The body and insert are provided with cooperating wall portions retained in tight-fitted engagement to maintain the assembly thereof.

Further, the engagement of the ribs with the insert wall may be a tight-fit engagement to further secure the elements in the assembled relationship.

The body and insert are provided with cooperating shoulder portions for accurately positioning the insert relative to the body in the assembled relationship so as to define the desired serpentine vent passage.

The vent plug may be formed of suitable low cost synthetic resin suitable for injection molding and having suitable acid-resistant characteristics and other characteristics commensurate with the temperature and other conditions under which the battery is to be used.

Thus, the vent plug of the present invention effectively eliminates the need for the use of porous flame-arresting elements and provides an extremely low cost flame-arresting vent plug structure.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
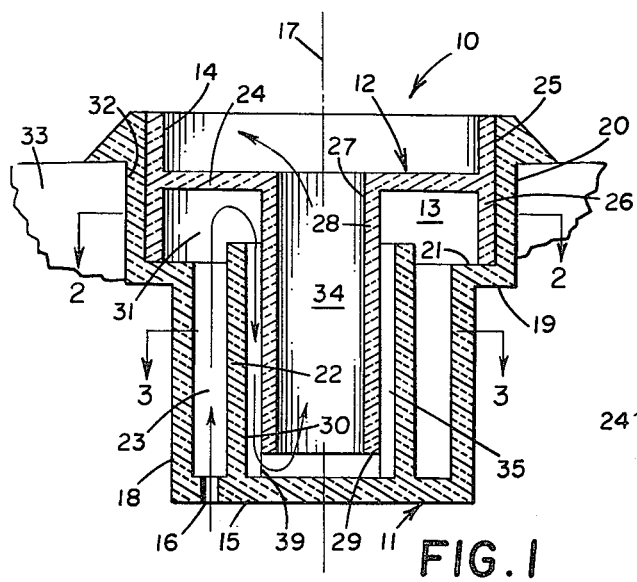
FIG. 1 is a diametric section of a battery vent plug embodying the invention.
Figure 4:
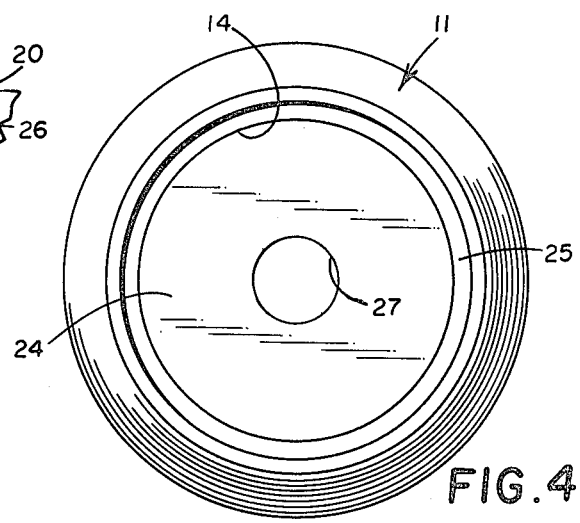
FIG. 4 is a top plan view of the vent plug.

In the exemplary embodiment of the invention as disclosed in the drawing, a battery vent plug generally designated 10 is shown to include a body portion 11 and an insert portion 12. The body and insert cooperatively define a gas vent passage generally designated 13 having an outlet 14 for venting gas from the battery to the ambient atmosphere.

The body is generally cup-shaped and defines a bottom wall 15 provided with a plurality of inlet openings 16 for conducting gas from the battery into the gas vent passage 13. In the illustrated embodiment, three such openings 16 are provided at 120-degree spaced positions about the vertical axis 17 of the vent plug.

Body 11 further defines an outer annular wall 18 upstanding from the periphery of bottom wall 15, an out-turned annular midwall portion 19, and an upper annular wall 20 upstanding from the periphery of the turned mid-portion wall 19. The upper surface 21 of the outturned wall 19 defines an upwardly facing annular stop shoulder.

Body 11 further defines an inner annular wall 22 upstanding from the bottom wall 15 radially inwardly of outer wall 18 so as to define with the outer wall 18 an annular inlet chamber 23.

The inlet openings 16 communicate with the inlet chamber 23, and in the illustrated embodiment, open into the lower end of the inlet chamber. As shown in FIG. 1, the inlet chamber is vertically elongate so as to define means for causing liquid electrolyte to drop back down for return through the inlet opening 16 into the battery.

Insert 12 includes a transverse top wall 24 which is fitted in the upper wall 20 of the body. More specifically, the insert top wall is provided with a tubular upstanding peripheral wall 25 and a peripheral depending wall 26 which are secured to the body wall 20 with a tight fit.

As further shown in FIG. 1, depending wall 26 extends into engagement with the stop shoulder 21 when the insert is fully inserted in the body so as to accurately position the insert therein. As shown in FIG. 1, when the depending wall 26 is brought into seated engagement with the stop shoulder 21, the upper end of upper wall portion 25 is flush with the upper end of the body wall 20.

As shown, the insert top wall 24 and upstanding peripheral wall 25 cooperatively define the outlet 14 which is thus recessed within the upper end of the body wall 20. The top wall is further provided with an axial opening 27 and a tubular outlet wall 28 depends from top wall 24 about opening 27 to terminate at its lower end 29 in spaced relationship to the body bottom wall 15.

As illustrated in FIG. 1, insert wall 28 is spaced radially inwardly of body inner wall 22 so as to define with the body inner wall an annular transfer chamber 30 which communicates at its upper end with the upper end of the inlet chamber 23 through an annular passage 31 defined by the insert walls 26, 24 and 28, respectively. As shown, the body inner wall 22 may extend slightly above the level of the shoulder 21.

Thus, when installed in the opening 32 of a battery top wall 33, the assembled vent plug 10 permits battery gases to be vented to the ambient atmosphere by flow through the circuitous flow passage 13 defined by the inlet openings 16, inlet chamber 23, annular chamber 31, transfer chamber 30, an inner outlet chamber 34 axially of the insert wall 28, the axial opening 27 at the top of chamber 34, and the outlet 14.

The present invention comprehends the provision in the vent plug of improved means for arresting a flame generated exteriorly of the vent plug so as to prevent the flame from passing inwardly through the passage 13 to the interior of the battery. As discussed above, a number of prior art devices have been developed to provide flame-arresting action in vent plugs. The present flame arrestor comprises a substantial improvement over the known devices in permitting the body and insert elements to be formed at low cost as by injection molding from suitable synthetic resins, while yet assuring high accuracy in the provision of the flame arrestor structure. More specifically, the invention comprehends the provision of a plurality of radially extending divider means on at least one of the body inner wall 22 and the insert outlet wall 28. In the illustrated embodiment, the divider means comprises a plurality of longitudinally extending ribs formed integrally with the body wall 22 and extending radially inwardly therefrom into fitted engagement with the outer surface of the insert outlet wall 28 so as to define a plurality of small cross section, elongated, vertically extending flame-arresting passages 36 in the transfer chamber 30. As shown, the flame-arresting passages extend the full height of the body wall 22 upwardly from bottom wall 15 and provide an effective means for quenching any flame tending to enter the flow passage 13 from outlet 14.

As indicated above, the body and insert may be formed by injection molding and the inner diameter of the ribs 35 may be accurately controlled by the use of a suitable accurate core pin so as to have accurate interference fit engagement with the outlet wall 28 in the assembled relationship of the body and insert, as shown in FIG. 1.

In the illustrated embodiment, the outer surface of outlet wall 28 is cylindrical and, thus, the distal surfaces 38 of ribs 35 comprise segmentally cylindrical surfaces.

As indicated above, the ribs 35 extend fully downwardly to the bottom wall 15, whereas the lower end 29 of the insert wall 28 is spaced above the bottom wall, thus, defining a transfer connecting passage 39 opening radially inwardly from the lower end of the flame-arresting passages 36.

Figure 2:
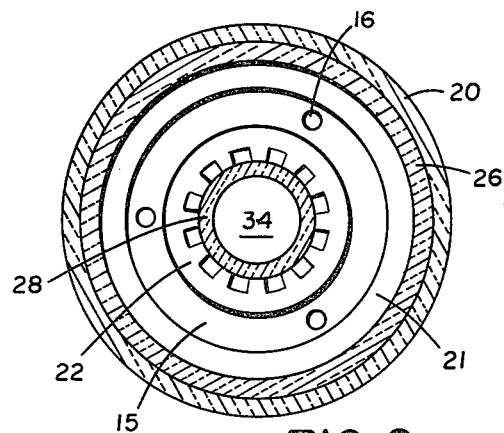
FIG. 2 is a transverse section thereof taken substantially along the line 2—2 of FIG. 1.
Figure 3:
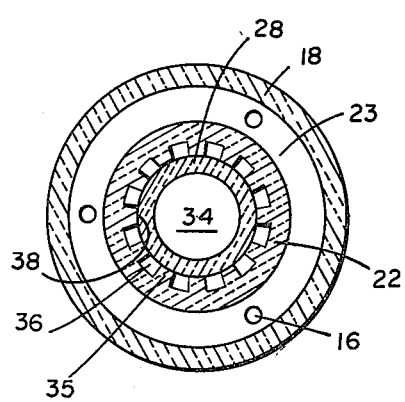
FIG. 3 is a transverse section thereof taken substantially along the line 3—3 of FIG. 1.
Figure 5:
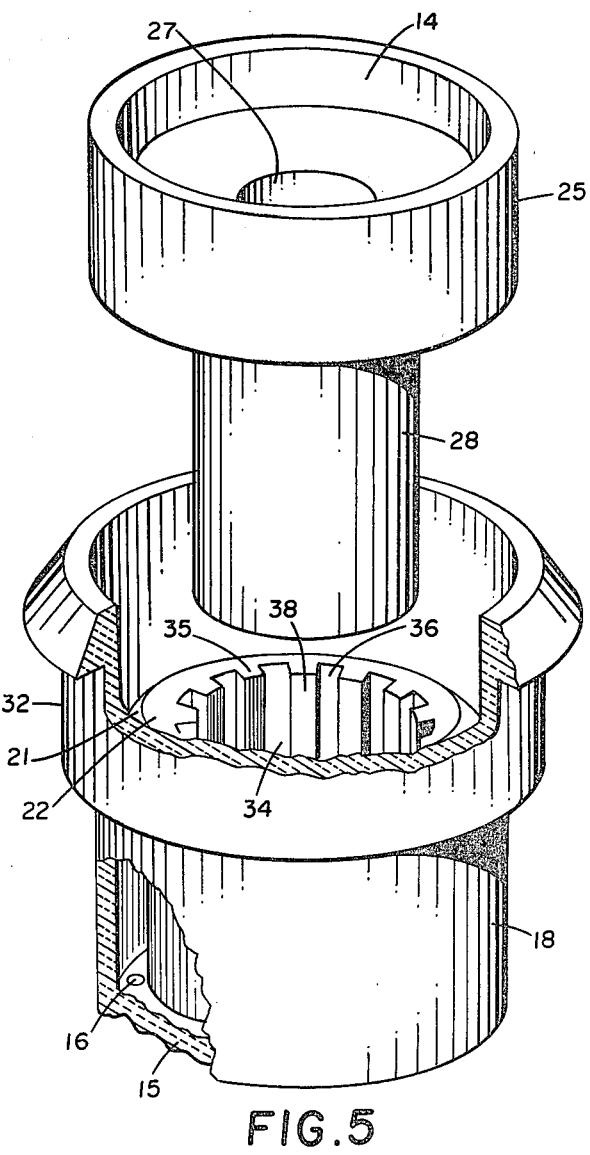
FIG. 5 is a fragmentary exploded perspective view thereof.

As illustrated in FIGS. 2 and 3, the annular walls of the body and insert are coaxially disposed relative to the central axis 17 of the vent plug, whereby each of the flow passage chambers is effectively an annular chamber also concentric of axis 17. The outlet opening 27 is disposed axially in the top wall 24.

As will be obvious to those skilled in the art, the invention may be utilized with the flame arresting passages extending not only in the vertical direction of the illustrated embodiment, but in other desired directions within the scope of the invention. Further, as will be obvious to those skilled in the art, the transfer chamber may be divided into the desired longitudinally extending small cross section passages by any suitable divider wall means. Further illustratively, the divider wall means may comprise wall means formed integrally with at least one of the body and insert elements.

The foregoing disclosure of specific embodiments is illustrative of the broad inventive concepts comprehended by the invention.

I claim:

1. A vent plug for use in venting gases through an opening in a battery top wall, said vent plug comprising:
 a body having an annular sidewall adapted to be fitted to the battery top wall and extend through said opening therein;

an insert fitted within said body, said body and insert defining an annular gas flow chamber; and means defining longitudinally extending dividers for dividing said flow chamber into a plurality of narrow elongated flame-arresting gas flow passages, said means comprising wall means formed integrally with at least one of said body and insert and in fitting engagement with the other of said body and insert members.

2. The vent plug of claim 1 wherein said body and insert comprise injection molded elements.

3. The vent plug of claim 1 wherein said divider means extends radially from at least one of said body and insert and defines distal ends accurately fitted to the other of said body and insert.

4. The vent plug of claim 1 wherein said divider means comprises ribs formed integrally with said body.

5. A vent plug for use in venting gases through an opening in a battery wall, said vent plug comprising:
    a body having a transverse end wall, an annular sidewall adapted to be fitted to the battery wall to extend through the opening therein, and an annular inner wall upstanding from said end wall to define with said sidewall an annular inlet chamber, said body defining at least one inlet opening communicating with said inlet chamber for admitting gases to be vented thereto;
    an insert having a transverse wall fitted in said annular outer wall and defining an outlet opening, and an annular outlet wall extending from said transverse wall to extend coaxially within said inner wall of said body to define with said inner wall an annular transfer chamber communicating at one end with one end of said inlet chamber, said outlet wall defining an inner outlet chamber communicating at one end with said outlet opening and communicating at the opposite end with the opposite end of said transfer chamber; and
    radially extending means on at least one of said body inner wall and insert outlet wall for dividing said transfer chamber into a plurality of elongate narrow flame-arresting gas transfer passages.

6. The vent plug of claim 5 wherein said radially extending means comprises an annular array of spaced vertically extending ribs on said body inner wall.

7. The vent plug of claim 6 wherein said radially extending means comprises ribs formed integrally with said body inner wall.

8. The vent plug of claim 6 wherein said radially extending means comprises ribs on said body inner wall and said insert outlet wall is force fitted within said ribs.

9. The vent plug of claim 6 wherein said radially extending means comprises ribs on said body inner wall having segmentally cylindrical distal radially inner surfaces and said insert outlet wall is radially outwardly cylindrical and force fitted to said distal rib surfaces.

10. The vent plug of claim 6 wherein said inlet chamber defines a lower end and at least one inlet opening is disposed to open directly into said lower end of said inlet chamber.

11. The vent plug of claim 6 wherein said at least one inlet opening is provided in said end wall of the body to open directly into the opposite end of said inlet chamber.

12. The vent plug of claim 6 wherein said insert top wall is spaced from said body inner wall to define therewith a transfer connecting passage between said one end of said inlet chamber and said one end of the transfer chamber.

13. The vent plug of claim 6 wherein said outlet wall defines an end spaced adjacent said body transverse end wall.

14. The vent plug of claim 5 wherein said body outer wall, body inner wall, and insert outlet wall are coaxially disposed.

15. A vent plug for use in venting gases through an opening in a battery top wall, said vent plug comprising:
    a cup-shaped body having a transverse bottom wall, an annular outer wall adapted to be fitted to the battery top wall to extend downwardly through the opening therein, and an annular inner wall upstanding from said bottom wall to define with said outer wall an annular inlet chamber, said body defining at least one inlet opening communicating with said inlet chamber for admitting gases to be vented thereto;
    an insert having a transverse cup-shaped upwardly opening top wall fitted in the upper end of said annular outer wall and defining an outlet opening, and an annular outlet wall depending from said top wall to extend downwardly within said upstanding inner wall of said body to define with said inner wall an annular transfer chamber communicating at an upper end with the upper end of said inlet chamber, said outlet wall defining an inner outlet chamber communicating at an upper end with said outlet opening and communicating at a lower end with the lower end of said transfer chamber; and
    radially extending means on at least one of said body inner wall and insert outlet wall for dividing said transfer chamber into a plurality of narrow flame-arresting gas transfer passages.

16. The vent plug of claim 15 wherein said outlet opening is disposed at the center thereof.

17. The vent plug of claim 15 wherein said body outer wall defines an inner, upwardly facing annular shoulder and said insert top wall defines a portion seated on said shoulder in the assembled arrangement of the insert and body.

18. The vent plug of claim 15 wherein said body outer wall defines an inner, upwardly facing annular shoulder and said insert top wall defines a depending annular portion seated on said shoulder in the assembled arrangement of the insert and body.

19. The vent plug of claim 15 wherein said body outer wall defines an inner, upwardly facing annular shoulder and said insert top wall defines a depending annular portion seated on said shoulder in the assembled arrangement of the insert and body and fitted in said body annular outer wall.

20. The vent plug of claim 15 wherein said body outer wall defines an inner, upwardly facing annular shoulder and said insert top wall defines a depending annular portion seated on said shoulder in the assembled arrangement of the insert and body, the periphery of said top wall including said depending annular wall being tightly fitted to said body annular outer wall.

21. A vent plug for use in venting gases through an opening in a battery top wall, said vent plug comprising:
    a body having an annular side wall adapted to be fitted to a battery top wall and extend through said opening therein;
    flame-arrestor means within said body, said body and said flame-arresting means defining gas entrance and exit passages and gas flow chamber, said flame-arresting means comprising a first annular member, a second annular member disposed radially outwardly of said first annular member and a plurality of ribs separating said annular members.

22. A vent plug as set forth in claim 21, wherein said ribs are integrally formed with one of said members.

23. A vent plug as set forth in claim 22, wherein said second annular member is integrally formed with said body.

24. A vent plug as set forth in claim 23, wherein said ribs are integrally formed with said second annular member.

25. A vent plug as set forth in claim 24, wherein said body has a transverse end wall integrally formed with said body.

26. A vent plug as set forth in claim 21, wherein said body includes an integrally formed transverse end wall.

27. A vent plug as set forth in claim 21, wherein said second annular member is coaxial with and has walls spaced radially outwardly from the walls of said first annular member by said plurality of ribs extending radially between and axially engaging the surfaces of each of said first and second members to thereby define a plurality of narrow flame-arresting gas flow passages between said members.

28. A vent plug as set forth in claim 26, wherein said ribs and second annular member are integrally formed with said end wall.

29. A vent plug as set forth in claim 21, wherein said ribs are integrally formed with said first annular member.

30. A vent plug as set forth in claim 28, wherein said first annular member comprises an insert and said insert axially engages said ribs on said second annular member.

* * * * *